United States Patent [19]

Kennedy

[11] 4,042,498

[45] Aug. 16, 1977

[54] SEPARATION OF ORGANIC COMPOUNDS BY ADSORPTION PROCESSES

[75] Inventor: David C. Kennedy, St. Louis, Mo.

[73] Assignee: Rohm and Haas Company, Philadelphia, Pa.

[21] Appl. No.: 605,780

[22] Filed: Aug. 18, 1975

Related U.S. Application Data

[63] Continuation-in-part of Ser. No. 365,006, May 29, 1973, abandoned, which is a continuation-in-part of Ser. No. 172,795, Aug. 18, 1971, abandoned.

[51] Int. Cl.$^2$ .............................................. C02B 1/14
[52] U.S. Cl. ....................................... 210/26; 210/32; 210/40
[58] Field of Search ................. 210/24, 30, 32, 40, 210/26; 260/618 D, 649 DP, 649 DD

[56] References Cited

U.S. PATENT DOCUMENTS

| | | | |
|---|---|---|---|
| 3,531,463 | 9/1970 | Gustafson | 210/24 |
| 3,852,490 | 12/1974 | Kohn | 210/24 |
| 3,853,758 | 12/1974 | Hurwitz et al. | 210/32 |

FOREIGN PATENT DOCUMENTS

| | | | |
|---|---|---|---|
| 1,391,174 | 4/1975 | United Kingdom | 210/24 |

OTHER PUBLICATIONS

*Colour Index,* Third Edition, Yorkshire, England, The Society of Dyers and Colourists, 1971, vol. 3, pp. 3496 & 3499.

*Primary Examiner*—Thomas G. Wyse
*Assistant Examiner*—Ivars Cintins
*Attorney, Agent, or Firm*—Louis F. Kline, Jr.

[57] ABSTRACT

Dissolved molecules of nonionogenic, hydrophobic, pesticidal, organic compounds are removed from streams by passing them through a bed or mass of macroreticular adsorbent resin. The preferred resins are aromatic in character, being composed of 80 to 90 weight percent of divinylbenzene, and from 20 to 10 weight percent of ethylvinylbenzene, and have a specific surface area of 800 square meters per gram ± 20%, a porosity of 50% ± 10% by volume, and an average pore diameter of 50 Angstrom Units ± 20%.

12 Claims, No Drawings

SEPARATION OF ORGANIC COMPOUNDS BY ADSORPTION PROCESSES

This application is a continuation-in-part of copending U.S. Pat. application Ser. No. 365,006 filed May 29, 1973, now abandoned, which in turn was a continuation-in-part of U.S. Pat. application Ser. No. 172,795 filed Aug. 18, 1971, now abandoned.

This invention relates to an adsorption-based process for the purification of an aqueous stream containing low levels of dissolved, non-ionogenic, hydrophobic, pesticidal, organic compounds. It also relates to a method of ecological improvement concerning removal of toxic organic compounds from industrial effluents.

The process of the invention may be employed either:
1. to purify contaminated aqueous streams by removing organic biocidal compounds; or
2. to separate and concentrate one or more components in substantially pure form of condition, from a mixture thereof.

BACKGROUND OF THE INVENTION

It is known to use ion exchange resins to selectively absorb certain ionically charged substances from aqueous systems, the adsorption being the result of ionic forces.

It is also known (U.S. Pat. No. 2,974,178) that soluble, cross-linked, addition polymer resins can be effectively employed to concentrate or separate non-ionogenic compounds in liquid phase from miscible mixtures thereof with other non-ionogenic liquids. The concentration or separation is based on selective or preferential imbibition or absorption by the resin of one of the liquids in the mixture apparently attributable to weak molecular forces rather then to ionic forces. By "preferential absorption," it is meant that the resin absorbs a mixture of the components having a higher concentration of what may be termed the "preferentially absorbed" component than is present in the original liquid mixture applied to the resin.

Such addition polymer resin have low surface areas, from 0.1 to 0.001 square meter per gram of resin, and the action depends on the fact that one of the liquids to be separated from the other has a greater solvent or swelling capacity for the resin. Hence it is preferentially imbibed within the body of the resin.

Many organic compounds cannot be effectively separated by such resins because they lack the capacity to be dissolved in, or to swell, the resin. This is particularly true if the solute is a solid substance, rather than a liquid; and it is also true of organic compounds having in their molecules domains of widely different polarity. Such compounds ordinarily cannot swell or dissolve in the resin mass, and, since many compositions contain no material capable of swelling the resin, the process of the afore-cited patent is of no use in concentrating or separating one component from such a mixture.

U.S. Pat. No. 3,531,463 discloses a process for separating from an aqueous medium of water-soluble substances having hydrophobic and hydrophilic portions in their molecules. These substances are primarily ionogenic and non-halogenated, quite hydrophilic and substantially soluble, in excess of 1000 ppm in aqueous solution. The process involves contacting the aqueous medium with particles of a non-ionogenic, macroreticular water-insoluble cross-linked polymer of polymerizable ethylenically unsaturated molecules comprising about 2 to 100 weight percent of at least one poly(vinylbenzene) monomer, selected from the group consisting of divinylbenzene, trivinylbenzene, alkyl divinylbenzenes having from 1 to 4 alkyl groups of 1 to 2 carbon atoms substituted in the benzene nucleus, and alkyltrivinylbenzenes having from 1 to 3 alkyl groups of 1 to 2 carbon atoms substituted in the benzene nucleus.

Further, certain resins of the present class, commercially available as Amberlite XAD-4 from the Rohm and Haas Company, Philadelphia, Pa., have been suggested as adsorbents for an aqueous system of phenol and its halogenated derivatives, with regeneration by means of dilute caustic soda. Caustic soda was shown to be an effective regenerant for phenols and other ionogenic organic compounds, owing to the weak adsorption of the ionized form of the solute, which is formed during regeneration. However, such a regeneration process would be of no practical value for the organic compounds treated by the present invention, since the latter are non-ionogenic and cannot be so removed from the resin.

In recent years, increasing notoriety and regulatory attack have been the lot of chemical manufacturers and compounders who have long handily disposed of toxic waste liquids into abutting water bodies. Prominent among these are the manufacturers and compounders of such chlorinated hydrocarbons as DDT, dicofol, aldrin, chlordane and the like, which are widely used as commercial pesticides. The products, the side products, and intermediates of their manufacture are biocidal. The acute mammalian toxicity of these products is high with an $LD_{50}$ of less than 5000 being normal and $LD_{50}$ of less than 500 not unusual. The toxicity of these materials extends also to other life forms both animal as well as vegetable.

In addition to high toxicity these chlorinated organic compounds are characterized by great persistence in the environment. They are not readily biodegradable and therefore accumulate in the environment and are concentrated in the food chain. As a consequence, increasing amounts of these compounds build up in human and animal tissue. Non-chlorinated pesticides cause lesser problems since despite their toxicity they are more readily biodegradable.

Considerable pressure is now being exerted to minimize or preclude the discharge of these chlorinated, organic compounds.

Industry has made major and expensive anti-stream pollution investments in means to minimize the hazard. One well-accepted technique involves the use of granular activated carbon to treat the subject class of plant effluents. As a commercial system, it is workable but expensive to build and operate. It also leaves much to be desired in adsorption kinetics, which lead to a high pesticide leakage, and hence to a low operating capacity and high operating costs. Furthermore, activated carbon possesses poor regeneration efficiency with chemical regenerants.

The latter requires that external thermal regeneration be employed, which entails a large expense in the construction of a regeneration furnace and associated equipment, and in replacing carbon lost by attrition during thermal regeneration.

THE INVENTION

The process of the present invention is generally characterized by performance far superior to the currently used carbon adsorption, both in terms of performance and verifiable capital and operating expenses.

The process outperforms the prior art techniques in these important aspects:

1. Superior adsorption kinetics as manifested in low leakage rates at the same effluent flow rate, thus a higher operating capacity is attainable at equivalent flow rate.
2. Where treating essentially the same effluent volume, considerably higher flow rates are achievable, and thus a comparatively lower bed volume of adsorbent is required.
3. Superior chemical regeneration features with an organic solvent permitting convenient disposal of solute-loaded regenerant or even recovery of any adsorbed process products from the plant effluent and regenerant.

By means of a conventional distillation facility forming no part of this invention, the adsorbed products may be recovered from the regenerant solvent and recycled to the manufacturing process. The solvent can also be recovered and reused as a regenerant.

It is, therefore, a principal object of this invention to provide an economical process for the chemical separation of varied organic compounds from manufacturing plant effluents, and other aqueous effluents, thereby effecting purification of these effluents.

It is another object of the invention to provide a resin matrix which can efficiently adsorb large amounts of organic compounds from an aqueous effluent.

It is another object to provide an adsorption system for toxic organic compounds, generally halogenated hydrocarbons, found in an aqueous stream which can be readily regenerated by chemical means.

It is still another object of the invention to provide a resin adsorbent that will maintain minimal leakage of compound to be adsorbed over a substantial volume of effluent streams being treated.

It is still a further object to provide a chemical regenerate system in which the regenerant is a volatile organic solvent which can be conveniently recovered by distillation.

Yet another objective is to provide efficient chemical regeneration of solute-loaded resin facilitating the practical recovery of any adsorbed organic products.

A further objective is to provide a substantially more economic means of effluent-purification compared to the presently employed activated carbon separation method.

In general, since these resins find their greatest value in the processing of aqueous solutions, they are preferably not extremely hydrophobic or water-repellent. The preferred resins are the cross-linked resins which have solubility parameters (expressed in the units/calories/cubic centimeter)

of at least about 8.5 and those having such parameters up to 15 or more are satisfactory for use in aqueous systems.

The present invention accordingly provides a method of ecological improvement, comprising separating molecules of the dissolved portion of a non-ionogenic organic pesticidal compound, having an essentially hydrophobic molecular nature, from an aqueous medium containing it, which comprises:

a. contacting the medium with particles of an essentially non-ionogenic, macroreticular, water-insoluble cross-linked polymer of polymerizable ethylenically unsaturated monomers comprising about 2 to 100 weight percent of at least one poly(vinylbenzene) monomer selected from the group consisting of divinylbenzene, trivinylbenzene, alkyldivinylbenzenes having from 1 to 4 alkyl groups of 1 to 2 carbon atoms substituted in the benzene nucleus, and alkyl trivinylbenzenes having from 1 to 3 alkyl groups of 1 to 2 carbon atoms substituted in the benzene nucleus, which polymer has a porosity of at least 25% ranging up to 75% by volume, a surface area of at least 10 to 1000 square meters per gram, and pores of an average diameter of at least 20 A ranging up to 20,000 A;

b. flowing a volatile organic solvent through the loaded polymer bed to release substantially all of the adsorbed compound.

Preferred solvents are selected from the group consisting of volatile ketone of 3 to 10 carbons, linear and branched alkanols having 1 to 10 carbons, alkyl esters of aliphatic acids from 1 to 10 carbons; aromatics to 10 carbons; mono- and polyhalogenated alkanes up to 3 carbon atoms.

Preferred resins have a surface area of 100 to 1000 square meters per gram or more preferably 280 to 960 square meters per gram.

Although the resins which are suitable in the invention may have pores having an average diameter of from 20 A to 20,000 A, preferred pore diameters are in the range of 20 A to 200 A. most preferred resins will have pore diameter sizes rarely exceeding 110 A.

The macroreticular resins employed as the adsorbents herein are not claimed as new compositions of matter in themselves. Any of the known materials of this type having the required physical characteristics are suitable. For example, there may be used the granular cross-linked polymers of this character prepared by suspension polymerization of polymerizable ethylenically unsaturated molecules comprising about 2 to 100 weight percent of at least one poly(vinylbenzene) monomer selected from the group consisting of divinylbenzene, trivinylbenzene, alkyldivinylbenzenes having from 1 to 4 alkyl groups of 1 to 2 carbon atoms substituted in the benzene nucleus, and alkyltrivinylbenzenes having 1 to 3 alkyl groups of 1 to 2 carbon atoms substituted in the benzene nucleus. Besides the homopolymers and copolymers of these poly(vinylbenzene) monomers, one or more of them may be copolymerized with up to 98% (by weight of the total monomer mixture) of monoethylenically unsaturated monomers.

Examples of other polyethylenically unsaturated compounds include: divinylpyridine, divinylnaphthalenes, trivinylnaphthalenes, and polyvinylanthracenes.

Examples of suitable monoethylenically unsaturated monomers that may be used in making the granular macro-reticular resin of the latter type include: ethylene, propylene, isobutylene, diisobutylene, styrene, vinyltoluene, ethylvinylbenzene and vinyl chloride.

Polyethylenically unsaturated monomers which ordinarily act as though they have only one such unsaturated group, such as isoprene, butadiene, and chloroprene, may be used as part of the monoethylenically unsaturated category.

The organic compounds treatable by the method of the present invention are characterized as being chlorinated, frequently polychlorinated organic compounds and non-ionogenic, that is they are not themselves ionically charged nor do they give rise to ionic species when dissolved in aqueous solutions of acids or bases. Generally classified as hydrophobic or "water-hating" organic compounds the hydrophobicity is reflected by the extremely low level of solubility of the compounds in water. The true water solubility of these compounds is generally less than 200 parts per million and often less than 50 ppm. The compounds preferably treated by the method of the invention may further be characterized by high chemical stability. Such stability takes the form of resistance to bacterial degradation, oxidation and hydrolysis and leads to the persistence of these organic compounds in the environment. A further characteristic of these compounds is their biocidal properties as reflected in their toxicity toward various life forms. This may be specifically manifested in such categories as fungicidal, insecticidal, miticidal, nematocidal, rodenticidal and the like. The acute mammalian toxicity of these compounds is generally quite high. The $LD_{50}$ is generally less than 5000 and commonly less than 500. However even in those cases where there is little or moderate mammalian toxicity, the compounds may still be highly toxic toward other life forms and thus pose a threat to the environment and the ecological balance thereof.

Representative of organic compounds which may be usefully separated by the method of the present invention are the following:

1,2,3,4,10,10-Hexachloro-1,4,4a,5,8,8a-hexahydroendo-1,4-exo-5,8-dimethanonaphthalene
polychlorobicyclopentadiene isomers
isomers of benzenehexachloride
1,2,4,5,6,7,8,8-octachloro-2,3,3a,4,7,7a-hexahydro-4,7,-methanoindene
1,1-dichloro-2,2-bis-(p-chlorophenyl)ethane
1,1-dichloro-2,2-bis-(p-ethylphenyl)ethane,
1,1,1-trichloro-2,2-bis(p-chlorophenyl)ethane,
dichlorodiphenyl dichloroethylene,
1,1-bis(p-chlorophenyl)-2,2,2-trichloroethanol, 2,2-dichlorovinyl dimethyl phosphate,
1,2,3,4,10,10-hexachloro-6,7-epoxy-1,4,4a,5,6,7 dimethanonaphthalene,
1,2,3,4,10,10-hexachloro-6,7-epoxy-1,4,4a,5,6,7,8,8a-octahydro-1,4-endo-endo-5,8-dimethanonaphthalene,
1,4,5,6,7,8,8a-heptachloro-3a,4,7,7a-tetrahydro-4,7-methanoindene,
1,2,3,4,5,6-hexachlorocyclohexane,
2,2-bis(p-methoxyphenyl)-1,1,1-trichloroethane,
chlorinated camphene with 67-69% chlorine, and polychlorinated biphenyls.

The preferred proportion of the polyethylenically unsaturated compound of the cross-linking type is in the range of about 2 to 100% by weight of the total monomer mixture from which the resin is prepared. The suspension polymerization produces the resin in the form of granules or beads having an overall bead size in the range of about 0.1 to about 3 millimeters average diameter. In this process the material or substance being separated or concentrated is adsorbed on the internal surface of the resin particles and the effectiveness of the process depends on the presence of a high ratio of internal surface area to the weight of the resin. This is in distinct contrast to the adsorption process of U.S. Pat. No. 2,974,178 mentioned earlier in which the resin particles are characterized by an extremely low ratio of surface area to weight (being only about 0.1 to 0.001 square meters per gram) as compared here to the range of 10 to 1,000 square meters per gram in the resins used in the present invention.

The adsorption process may be carried out in a simple batch operation or by a continuous procedure. In the batch operation, the resin adsorbent may be supported in a suitable adsorption cell or vessel which in most practical operations normally takes the form of a tower or column suitably packed with the resin particles which may be of any suitable size or mesh such as that which will pass through a 16-mesh screen but will largely be trapped by a 100-mesh screen (U.S. Standard). The liquid mixture is passed through the resin mass at a suitable rate, such as from top to bottom, or vice versa, so that the chlorinated organic compounds are adsorbed on the resin surfaces. Alternatively, the resin particles may pass in countercurrent relation to the liquid. For example, the particles may be continuously fed to the top of a column or tower into the bottom of which the liquid is fed continuously, the particles being removed from the bottom for subsequent treatment to remove or separate the substance adsorbed in any manner hereinbelow indicated, and the liquid issuing from the top being additionally treated, if desired, as indicated hereinafter.

A complete separation of the adsorbed components from a mixture may be effected by the use of a desorbent or eluent in a continuous process. In a continuous procedure, which may also be called a cyclic process, the mass of resin supported suitably, as in a tower or column, may be fed alternately with the pesticide waste stream and with a desorbent. The desorbent is an organic solvent which is commonly miscible with both the solute and its aqueous media at the operating temperature, which usually may be anywhere above the freezing point, and below the boiling point, of part or all of the liquids involved, and is preferably between 15° and 35° C. The desorbent used can be a single substance or it may be a liquid mixture of several compounds or it may be two or more liquids introduced in succession. Unless a mixture of the desorbent with the adsorbed solute is desired, the desorbent should be readily separable from the solutes, preferably by fractional distillation, or by crystallization, or extraction so that adsorbed components can be obtained in substantially pure form, and so that the desorbent may be readily recovered and reused, if desired.

Besides the single column continuous systems just described, the liquid under treatment may be passed in succession through a plurality of fixed beds of the copolymer adsorbent or through a plurality of beds thereof which are moved continuously or stepwise in countercurrent relation to the liquid.

To assist those skilled in the art to practice the present invention, the following modes of operation are suggested by way of illustration, parts and percentages being by weight and the temperatures in °C. unless otherwise specifically noted.

A test column was utilized to demonstrate the comparative utilities of a standard activated carbon and a representative macroreticular resin of the class disclosed as being useful herein. Resin A is a cross-linked copolymer, which is composed of about 85% divinylbenzene and 15% ethylvinylbenzene. It takes the form of 20 to 60 mesh beads, encompassing a large plurality of microspheres that are very hard, attrition-resistant and non-compressible. Bead porosity approximates 51% by volume and the average pore diameter is 50 A. Resin density is 39 pounds per cubic foot. Bead surface area averages 750 square meters per gram, or 4.6 square miles per cubic foot.

A standard fixed bed column is employed, capable of flow rates of the treatable effluent ranging from 0.05 to 10 gallons per minute per cubic foot of installed macroreticular resin. Preferably, the range is 0.05 to 2.0 gallons per minute. The column is operated on the separation phase for as many bed volumes of effluent as can be passed therethrough until solute leakage reaches unacceptable levels, whereupon there is a switchover to the regeneration cycle.

EXAMPLE I

A laboratory column was loaded with 20 ml. of the aforedescribed Resin A. The top end influent comprised an aqueous mixture of chlorinated hydrocarbons emanating from a commercial plant manufacturing diethyldiphenyldichloroethane (PERTHANE), in a concentration of 118 ppm (by total carbon analysis). The flow rate is 0.5 gallons per minute per cubic foot.

It was observed that leakage of hydrocarbons was less than 1 ppm up until some 35 bed volumes of effluent had been treated, when it rose rather sharply to about 120 ppm at 40 bed volumes. This is an unacceptable leakage rate, which would provoke shutdown of that particular bed for chemical regeneration with a suitable solvent, like acetone, methanol or isopropanol.

EXAMPLE II

A comparative study of Resin A and granular activated carbon was conducted in apparatus identical to Example I, but with somewhat different operating parameters to contrast the bed longevity until solute leakage dictates shutdown and regeneration. The influent flow rate is 0.125 GPM/ft.$^3$ and the chlorinated organic pesticide concentration (CLP) was 33.5 ppm.* The influent was the waste effluent from the commercial manufacture of dicofol.**

* Total chlorinated organic pesticides includes such compounds as the common DDT isomers, DDD isomers, and dicofol. ** 1,1-bis(p-chlorophenyl)-2,2,2-trichloroethanol.

The data obtained are presented graphically in the Figure. It is striking to observe that the leakage level plateaued and remained acceptably low up to 120 bed volumes, whereas with activated carbon such level reached a significant leakage rate of 75 bed volumes and a highly unacceptable rate at 110 volumes, which is indicative of slow adsorption kinetics. The corollary of this event is the need for frequent shutdown for carbon regeneration. Also required are more installed units, so that working capacity is always continuously available.

EXAMPLE III

In like manner to Example II, Resin A and granular activated carbon were compared for the treatment of a waste effluent arising from the manufacture of dicofol. Also included in the comparison was Resin B. Resin B is a cross-linked polystyrene copolymer which is composed of 50% divinylbenzene and 50% of a mixture of styrene and ethylvinylbenzene. It takes the form of 20 to 60 mesh beads with bead porosity of approximately 40%, surface area of about 350 square meters per gram and average pore diameter of 90 Angstrom Units. For this experiment, the flow rate was increased to 0.25 GPM/ft.$^3$ to accentuate the kinetic advantages of Resin A. The concentration of pesticides in the influent was 15 ppm.

Table I

Influent: Filtered Plant Dicofol Waste, 15 ppm CLP
Flow Rate: 0.25 GPM/ft.$^3$

| Bed Volumes Treated | Leakage | | |
|---|---|---|---|
| | Resin A | Resin B | Carbon |
| 10 | <0.05 | 0.30 | 0.25 |
| 120 | 0.45 | 0.05 | 3.40 |
| 340 | 0.35 | 1.50 | 1.00 |
| 410 | 0.45 | 0.55 | 6.35 |
| 660 | 0.40 | 0.50 | 1.95 |
| Average Leakage | 0.33 | 0.69 | 2.04 |

Note that at this flow rate the leakage of Resin A never exceeds 0.5 ppm and averages 0.33 ppm. On the other hand, activated carbon gives considerably higher leakage: over 2 ppm on the average.

EXAMPLE IV

Separate columns loaded with solute from a dicofol manufacturing process, one bedded with Resin A and the other with activated carbon, were subjected to chemical regeneration with isopropanol, each at a flow rate of 0.125 GPM/ft.$^3$ of adsorbent.

The comparative performance of the same regenerant solvent as a function of regenerant bed volume is shown in Table II below. The data quantifies the comparative successes as indicated by the total mg. eluted (and calculated percent eluted).

Table II

| Bed Volumes Treated | Concentration of Effluent (ppm) | |
|---|---|---|
| | Resin A | Activated Carbon |
| 2 | 1788 | 51 |
| 4 | 194 | 39 |
| 6 | 128 | 5.1 |
| 8 | 33 | 3.2 |
| Total mg Eluted | 84.8 mg | 3.97 mg |
| Percent Eluted | 145%* | 10.5% |

*This high value is believed due to the difficulty of measuring accurately the very high level of pesticide in the first fraction eluted.

The rapid release of imbedded solute with the resin at just two bed volumes is evident, with but eight bed volumes effecting a substantial cleaning of the resin bed. Contrasting this is the very low concentration of solutes in the regenerating solvent for activated carbon, which indicates a prolonged and not very effective regeneration. It is in the latter event that thermal treatment of the carbon bed will become imperative to restore it to a workable condition.

I claim:

1. A method of ecological improvement, which involves separating a relatively insoluble non-ionogenic, hydrophobic chlorinated pesticidal organic compound from an aqueous medium containing the same at extremely low levels, which comprises:

a. passing the medium through a bed of particles of an essentially non-ionogenic, macroreticular, water-insoluble crosslinked polymer of polymerizable ethylenically unsaturated monomers comprising about 2 to 100 weight percent of at least one poly(vinyl)benzene monomer selected from the group consisting of divinylbenzene, trivinylbenzene, alkyldivinylbenzenes having from 1 to 4 alkyl groups of 1 to 2 carbon atoms substituted in the benzene nucleus, and alkyl trivinylbenzenes having from 1 to 3 alkyl groups of 1 to 2 carbon atoms substituted in the benzene nucleus, which polymer has a porosity of at least 30% ranging up to 70% by volume, a surface area of 800 ± 20% square meters per gram, and pores of an average diameter of at least 20 A ranging up to 200 A; and b. flowing a volatile organic solvent, selected from the group consisting of volatile ketones of 3 to 10 carbons, linear and branced alkanols having 1 to 10 carbons, alkyl esters of aliphatic acids from 1 to 10 carbons, aromatics to 10 carbons, and mono- and poly-halogenated alkanes up to 3 carbon atoms, through the loaded polymer bed to release substantially all of the adsorbed compound.

2. A method according to claim 1 wherein the non-ionogenic, macroreticular resin is in the form of small spheroidal beads of predominantly 20 to 60 mesh size.

3. A method according to claim 1 wherein the said polymer is composed of 80 to 90 weight percent of divinylbenzene and from 20 to 10 weight percent of ethylvinylbenzene, both percentages being by weight, a specific surface area of 800 square meters per gram ± 20%, a porosity of 50% ± 10% by volume, and an average pore diameter of 50 A ± 20%.

4. The method according to claim 1 wherein the organic solvent containing the desorbed organic compounds is subjected to a distillation step whereby the organic solvent is recovered, and the organic compounds are separately recovered.

5. A method according to claim 1 wherein the said polymer is composed of 40 to 60 weight percent of divinylbenzene, and from 60 to 40 weight percent of styrene, both percentages being by weight, a porosity of 45% ± 10% by volume, and an average pore diameter of 90 A units ±20%.

6. A method according to claim 1 wherein said organic compounds comprise 1,1,1-trichloro-2,2-bis-(p-chlorophenyl)ethane.

7. A method according to claim 1 wherein said organic compounds comprise 1,2,3,4,10,10-hexachloro-1,4,4a,5,8,8a-hexahydro-endo-1, 4-exo-5,8-dimethanonaphthalene.

8. A method according to claim 1 wherein said organic compounds comprise 1,1bis(p-chlorophenyl)-2,2,2-trichloroethanol.

9. A method according to claim 1 wherein said organic compounds comprise 1,1-dichloro-2,2-bis-(p-chlorophenyl)ethane.

10. A method according to claim 1 wherein said organic compounds comprise 1,2,4,5,6,7,8,8-octachloro-2,3,3a,4,7,7a-hexahydro-4,7,-methanoindene.

11. A method according to claim 1 wherein said organic compounds comprise 1,1-dichloro-2,2-bis-(p-ethylphenyl)ethane.

12. A method according to claim 1 wherein said organic compounds are polychlorinated biphenyls.

* * * * *